United States Patent
Ishii et al.

(10) Patent No.: US 7,768,711 B2
(45) Date of Patent: Aug. 3, 2010

(54) MANUFACTURING METHOD OF LIGHT-COLLECTING DEVICE, LIGHT-COLLECTING DEVICE AND PHASE SHIFT MASK

(75) Inventors: Motonori Ishii, Osaka (JP); Kazutoshi Onozawa, Osaka (JP); Toshinobu Matsuno, Kyoto (JP); Takanori Yogo, Kyoto (JP); Kimiaki Toshikiyo, Osaka (JP)

(73) Assignee: Panasonic Corporation, Osaka (JP)

( * ) Notice: Subject to any disclaimer, the term of this patent is extended or adjusted under 35 U.S.C. 154(b) by 1083 days.

(21) Appl. No.: 11/423,989

(22) Filed: Jun. 14, 2006

(65) Prior Publication Data
US 2006/0285228 A1 Dec. 21, 2006

(30) Foreign Application Priority Data
Jun. 17, 2005 (JP) .............................. 2005/178586

(51) Int. Cl.
*G02B 3/00* (2006.01)
(52) U.S. Cl. ..................................... 359/642; 264/1.32
(58) Field of Classification Search ................ 359/642; 264/1.32; 65/37; 430/321
See application file for complete search history.

(56) References Cited

U.S. PATENT DOCUMENTS

| | | | | | |
|---|---|---|---|---|---|
| 6,107,000 | A | * | 8/2000 | Lee et al. ..................... | 430/296 |
| 6,162,590 | A | * | 12/2000 | Block et al. .................. | 430/321 |
| 2006/0102827 | A1 | | 5/2006 | Kasuga et al. | |

FOREIGN PATENT DOCUMENTS

| | | |
|---|---|---|
| JP | 8-298315 | 11/1996 |
| JP | 10-170822 | 6/1998 |
| JP | 2000-039503 | 2/2000 |
| JP | 2001-196568 | 7/2001 |
| JP | 2004-117689 | 4/2004 |

OTHER PUBLICATIONS

English Language Abstract of JP 2001-196568.
English Language Abstract of JP 2004-117689.
U.S. Appl. No. 10/576,023 to Toshikiyo, filed Apr. 17, 2006.
U.S. Appl. No. 10/576,273 to Toshikiyo, filed Apr. 18, 2006.

(Continued)

*Primary Examiner*—Joseph Martinez
*Assistant Examiner*—James R Greece
(74) *Attorney, Agent, or Firm*—Greenblum & Bernstein, P.L.C.

(57) ABSTRACT

The present invention provides a method of manufacturing a lens, in which the method includes exposing a photoresist to light using a phase shift mask. Here, the phase shift mask includes layout portions respectively corresponding to pixels and lens, in which each of the layout portions has: a light-blocking portion which has a shape of a substantially circle or a substantially concentric zone; a light-transmitting portion which has a shape of a substantially circle or a substantially concentric zone; a phase shift portion which has a shape of a substantially circle or a substantially concentric zone; and a light-blocking frame. Furthermore, the light-transmitting portion, the light-blocking portion and the phase shift portion are arranged alternately so as to form concentric circles, and the light-blocking frame corresponds to a whole or a part of a perimeter of the lens.

10 Claims, 11 Drawing Sheets

OTHER PUBLICATIONS

U.S. Appl. No. 11/423,776 to Toshikiyo et al., filed Jun. 13, 2006.
U.S. Appl. No. 11/423,803 to Toshikiyo et al., filed Jun. 13, 2006.
U.S. Appl. No. 11/422,708 to Yamaguchi et al., filed Jun. 7, 2006.

English language Abstract of JP 2000-039503, Feb. 8, 2000.
English language Abstract of JP 10-170822, Jun. 26, 1998.
English language Abstract of JP 8-298315, Nov. 12, 1996.

* cited by examiner

MANUFACTURING METHOD OF LIGHT-COLLECTING DEVICE, LIGHT-COLLECTING DEVICE AND PHASE SHIFT MASK

BACKGROUND OF THE INVENTION (1) Field of the Invention

The present invention relates to a manufacturing method of a light-collecting device to be formed as a lens in a solid-state image sensor and the like, the light-collecting device, and to a phase shift mask.

(2) Description of the Related Art

In general, an apparatus which converts an image into an electric signal (this apparatus is referred to as an imaging apparatus) is used for an appliance which electromagnetically records an image such as a digital video recorder, a digital still camera, and a camera-equipped cellular phone which has been rapidly growing in number. In recent years, a charge-coupled device sensor which is a type of a semiconductor device (this is commonly called as a CCD sensor and is referred to as a CCD sensor, hereinafter) and a MOS sensor are used as such imaging apparatuses. The introduction of such sensors has contributed to make the appliance smaller and lower-priced. Each of these imaging apparatuses is made up of fine-pixels respectively including one photodiode that are arranged on a plane. Accordingly, performance of an imaging apparatus is determined depending on the performances of these number of pixels. The particularly significant performances of the imaging apparatus are a capability of converting a fine input image into an electric signal with low noise (i.e. high S/N ratio) and a capability of outputting the input image as a high electric signal (i.e. with high amplification factor). As a method for realizing a high S/N ratio and high amplification factor, a method of improving the S/N ratio and amplification factor of an imaging device in a pixel is generally suggested. Here, the following method is also commonly adopted.

FIG. 1 is a diagram showing a cross-section of a pixel unit in a typical conventional imaging apparatus. The pixel unit includes a pixel 901 and a light-collecting device 903 which is a lens. The pixel 901 includes a photodiode 902, a color filter 904 and the like. The incident light 905 entering the pixel 901 is collected by the light-collecting device 903 and separated into one of red, blue and green light by the color filter 904, and inputted into the photodiode 902. The intensity and density of the incident light 905 entering the photodiode 902 is increased by the light-collecting device 903. Therefore, the high S/N ratio and the improvement in amplification factor can be realized. Here, a problem is that a focal point of the light-collecting device 903 is changed along with the change of the incident angle of the incident light 905, so that the light cannot be collected on the photodiode 902. This is obvious in the case where the pixel 901 is a peripheral pixel in the imaging apparatus. In order to overcome this problem, there is a conventional technology of arranging light-collecting devices 903 in pixels so as to be asymmetrical to each other (e.g. Japanese Laid-Open Patent Application No. 2001-196568). In addition, there is another conventional technology of shifting the position of the light-collecting device 903 to the photodiode 902 in a peripheral pixel of the imaging apparatus. However, these conventional technologies are effective when the incident angle of the incident light 905 is relatively small. However, they are less effective for a larger incident angle.

SUMMARY OF THE INVENTION

Here, in order to maintain pixel characteristics even in the case where light enters at a large incident angle, there is a suggested technique of forming a light-collecting device, which is different from the technique used for the light-collecting device shown in FIG. 1, with light-transmission films 1001 which are processed into circles having the same center or into zones as shown in FIGS. 3A and 3B.

However, it is difficult to fine-process, as a light-collecting device, the circles or zones as fine as a wavelength of natural light for image-taking as the light-transmitting films 1001 shown in FIGS. 3A and 3B. Or, there is a problem that this fine-structured light-collecting device cannot be manufactured.

In general, for manufacturing a fine structure, in recent years, light exposure is performed with light of a short wavelength such as light using KrF (wavelength of 0.248 µm) or light using ArF (wavelength of 0.193 µm). Furthermore, a phase shift mask is used as a photomask for light exposure so as to realize the fine processing. There are two types of phase shift mask: a halftone type; and an interleave (Levenson) type. It is known that the Levenson type is more effective for the fine processing. The Levenson type phase shift mask (simply referred to as a phase shift mask, hereinafter) is characterized in that light-transmitting portions and phase shift portions are alternately arranged on both sides of respective light-blocking portions. Also, the light-transmitting portions and the phase shift portions cannot be connected to each other due to the structure of the phase shift mask. Therefore, the light-blocking portions always have to be placed between the light-transmitting portions and the phase shift portions. Light which passes through a phase shift portion is shifted 180° in phase compared to light which passes through a light-transmitting portion.

With respect to the light-collecting device shown in FIGS. 3A and 3B, in the imaging plane in which pixels are arranged in a matrix, the image-collecting devices of the peripheral pixels are actually placed so as to be shifted from the center of the imaging plane. Therefore, a shape of the light-collecting device as shown in FIG. 2 is repeatedly seen in the peripheral pixels. FIG. 2 is a schematic diagram showing a top view of adjacent four pixels. In the diagram, 1102 indicates a pixel boundary and 1103a to 1103c indicate apertures. In order to manufacture a light collecting device using photolithography technique, a photomask must be used. The photomask has a light-blocking element placed in a region corresponding to the light-transmitting film 1001 and the apertures 1103 which allow transmission of light (whereas opposite case is available depending on a manufacturing method, it is assumed that the photomask has the light-blocking material placed in a region corresponding to the light-transmitting film 1001, hereinafter). Furthermore, in order to realize a fine structure, this manufacturing method of a light-collecting device requires a process of light-exposure using a phase shift mask. However, it is difficult to apply a phase shift mask to the aforementioned shape. This is because the aperture 1103a and the aperture 1103b adjacent to the light-transmitting film 1001 are connected to the aperture 1103c of an adjacent pixel at the pixel boundary 1102, so that this shape cannot be realized with a phase shift mask in which a light-transmitting portion, a light-blocking portion and a phase shift portion need to be alternatively arranged. For example, if a light-transmitting portion corresponds to the aperture 1103a, a phase shift portion needs to correspond to the aperture 1103b. Here, if the aperture 1103c is the light-transmitting portion, the aperture 1103b and the aperture 1103c are connected at the pixel boundary 1102 so that the light-transmitting portion and the phase shift portion are connected to each other. Thus, there is a problem that a fine structure cannot be realized in a light-collecting device having a substantially concentric zone shape as shown in FIGS. 3A and 3B.

An object of the present invention is to provide a phase shift mask which facilitates the realization of a fine structure of a light-collecting device as a lens having a substantially concentric zone shape, a method of manufacturing a light-collecting device using the phase shift mask, and the light-collecting device.

In order to achieve the aforementioned object, a method of manufacturing a lens of the present invention includes exposing a photoresist to light using a phase shift mask, wherein the phase shift mask includes layout portions respectively corresponding to pixels and lens. Here, each of the layout portions has: a light-blocking portion which has a shape of a substantially circle or a substantially concentric zone; a light-transmitting portion which has a shape of a substantially circle or a substantially concentric zone; a phase shift portion which has a shape of a substantially circle or a substantially concentric zone; and a light-blocking frame, wherein the light-transmitting portion, the light-blocking portion and the phase shift portion are arranged alternately so as to form concentric circles, and the light-blocking frame corresponds to a whole or a part of a perimeter of the lens.

According to this structure, in the process of manufacturing a lens having a near-concentric zone shape, the lens can be easily fine-processed by placing a light-blocking frame. This is because that the light-blocking frame is always placed between the light-transmitting portions and the phase shift portions so that the light-transmitting portions and phase shift portions are not connected to each other at pixel boundaries.

Here, a width of the light-blocking frame may be as large as a minimum manufacturing dimension of the phase shift mask.

Here, a width of the light-blocking frame may be approximately 0.4 μm.

Here, the layout portions include a first layout portion corresponding to a first pixel, and four adjacent layout portions corresponding to four pixels which are respectively adjacent in all four directions to the first pixel. Phase shift portions may be positioned in regions of the adjacent layout portions, the regions corresponding to a region of the first layout portion in which a light-transmitting portion is positioned, and light-transmitting portions may be positioned in regions of the adjacent layout portions, the regions corresponding to a region of the first layout portion in which a phase shift portion is positioned.

With this structure, the frame placed on the lens corresponding to the light-blocking frame can be manufactured through more precise fine processing so that deterioration in characteristics due to distortion of the lens can be prevented.

Here, in the method of manufacturing a lens, the layout portions include a first layout portion corresponding to a first pixel, and a second layout portion corresponding to a pixel adjacent to the first pixel. A first section and a second section may be included in a light-blocking frame at which the first layout portion and the second layout portion are adjacent to each other; the first section may be smaller than the second section; the first section may be a section having phase shift portions on both sides of the light-blocking frame, and be a section having light-transmitting portions on both sides of the light-blocking frame; and the second section may be a section having a phase shift portion on one side of the light-blocking frame and a light-transmitting portion on the other side of the light-blocking frame.

With this structure, a lens can be fine-processed with lesser distortions.

Here, in the method of manufacturing a lens, the layout portions may include a first layout portion corresponding to a first pixel and a second layout portion corresponding to a second pixel adjacent to the first pixel. A light-blocking frame may be positioned in a specific section in a boundary between the first layout portion and the second layout portion, and the specific section may be a section having a phase shift portion on one side of the boundary and a light-transmitting portion on the other side of the boundary.

With this structure, by forming the light-blocking frame not on an entire perimeter of a layout portion that is one pixel but on a part of the perimeter, the deterioration in characteristics due to a frame placed on a corresponding lens can be controlled at minimum.

Here, the specific section may be smaller than other sections in the boundary of a perimeter of each layout portion.

Furthermore, the lens of the present invention includes light-collecting films which have a shape of substantially circles or substantially concentric zones, and a frame which surrounds a whole or a part of a perimeter of the lens.

According to this structure, a lens can be easily fine-processed by placing a frame.

Here, the frame may be made of a same material used for the light-transmitting film or be made of an absence of the light-transmitting film.

Here, a width of the frame may be obtained approximately by dividing a minimum manufacturing dimension of a phase shift mask by a light-exposure ratio.

Here, the width of the frame may be 0.1 μm or less.

Furthermore, a phase shift mask of the present invention is a phase shift mask used for manufacturing a lens. The phase shift mask includes layout portions respectively corresponding to pixels and lenses. Here, each of the layout portions has: a light-blocking portion which has a shape of a substantially circle or a substantially concentric zone; a light-transmitting portion which has a shape of a substantially circle or a substantially concentric zone; a phase shift portion which has a shape of a substantially circle or a substantially concentric zone; and a light-blocking frame, wherein the light-transmitting portion, the light-blocking portion and the phase shift portion are arranged alternately so as to form concentric circles, and the light-blocking frame corresponds to a whole or a part of a perimeter of the lens.

Here, a width of the light-blocking frame may be as large as a minimum manufacturing dimension of the phase shift mask.

Here, a width of the light-blocking frame may be approximately 0.4 μm.

As described in the above, according to the manufacturing method of the present invention, in a process of manufacturing a lens having a substantially concentric zone shape, a light-blocking frame is always positioned between the light-transmitting portion and the phase shift portion so that the light-transmitting portion and the phase shift portion do not connect to each other. Consequently, a fine processing can be facilitated.

Further, the frame placed on the lens corresponding to the light-blocking frame can be manufactured through more precise fine processing so that deterioration in characteristics due to distortion of the lens can be prevented.

Furthermore, according to the lens of the present invention, a fine processing can be facilitated in accordance with a shape of the lens.

In addition, with the phase shift mask of the present invention, the lens can be easily fine-processed and deterioration in characteristics due to distortion of the lens can be prevented.

As further information about technical background to this application, the disclosure of Japanese Patent Application No. 2005-178586 filed on Jun. 17, 2005 including specification, drawings and claims is incorporated herein by reference in its entirety.

BRIEF DESCRIPTION OF THE DRAWINGS

These and other objects, advantages and features of the invention wilt become apparent from the following description thereof taken in conjunction with the accompanying drawings that illustrate a specific embodiment of the invention. In the drawings.

DESCRIPTION OF THE PREFERRED EMBODIMENTS

Figure 1:
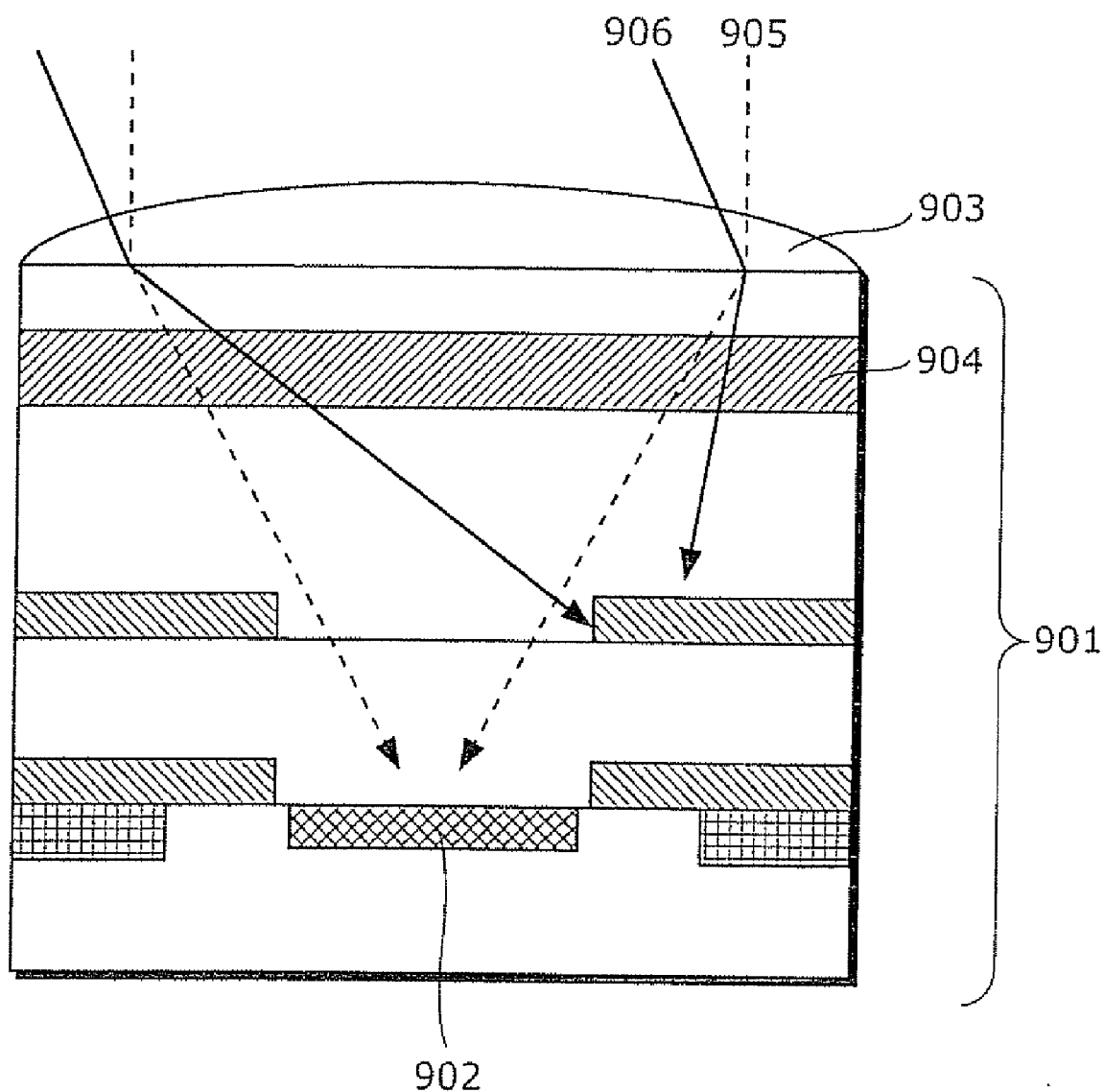
FIG. 1 is a diagram showing a cross-section of a pixel unit in an imaging device using a conventional technology.
Figure 2:
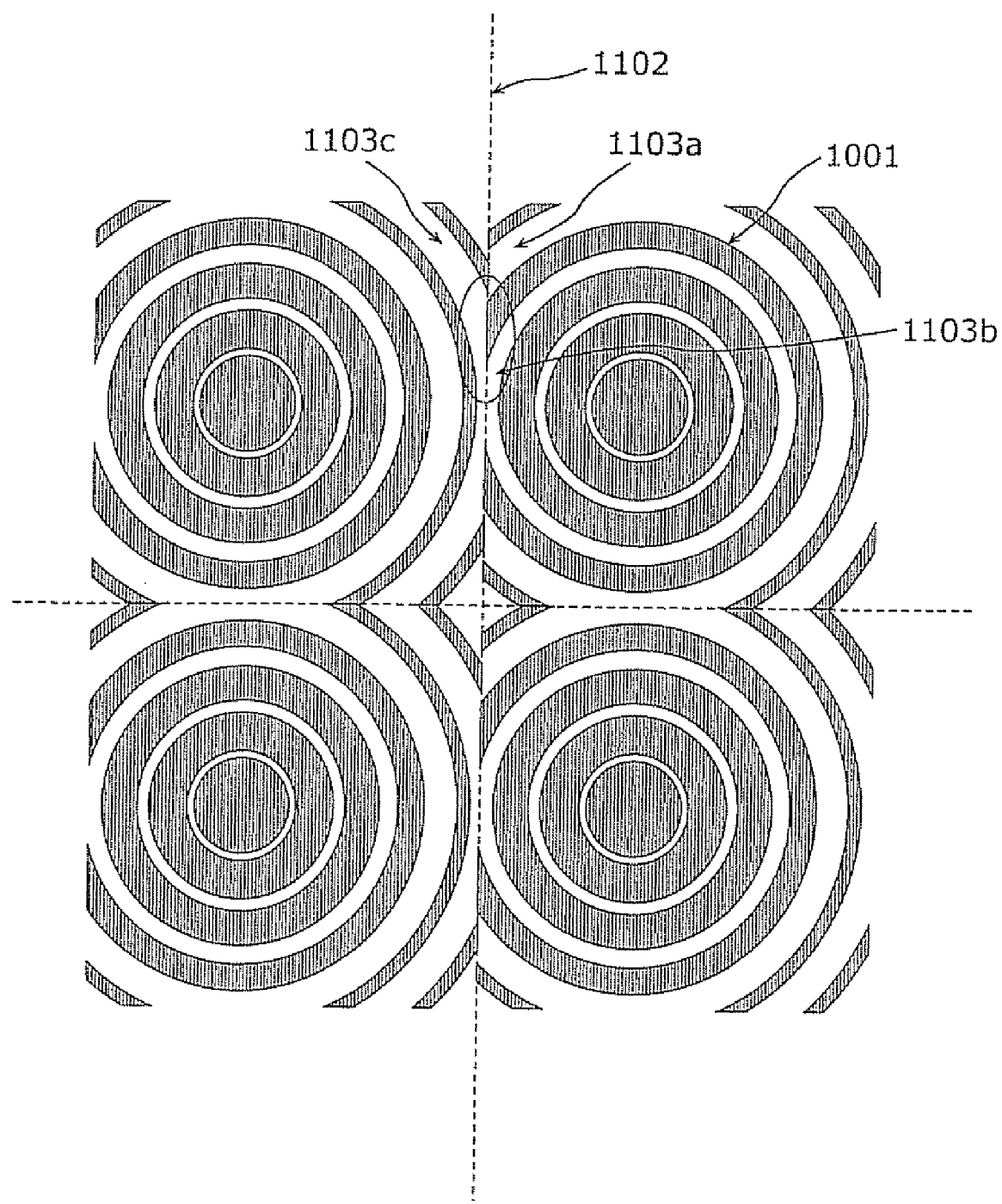
FIG. 2 is a schematic diagram showing a top view of four adjacent pixels.

Embodiments of the present invention shall be described with reference to the drawings, hereinafter. In the drawings, same reference numbers indicate same constituent elements.

First Embodiment

Figure 3A:
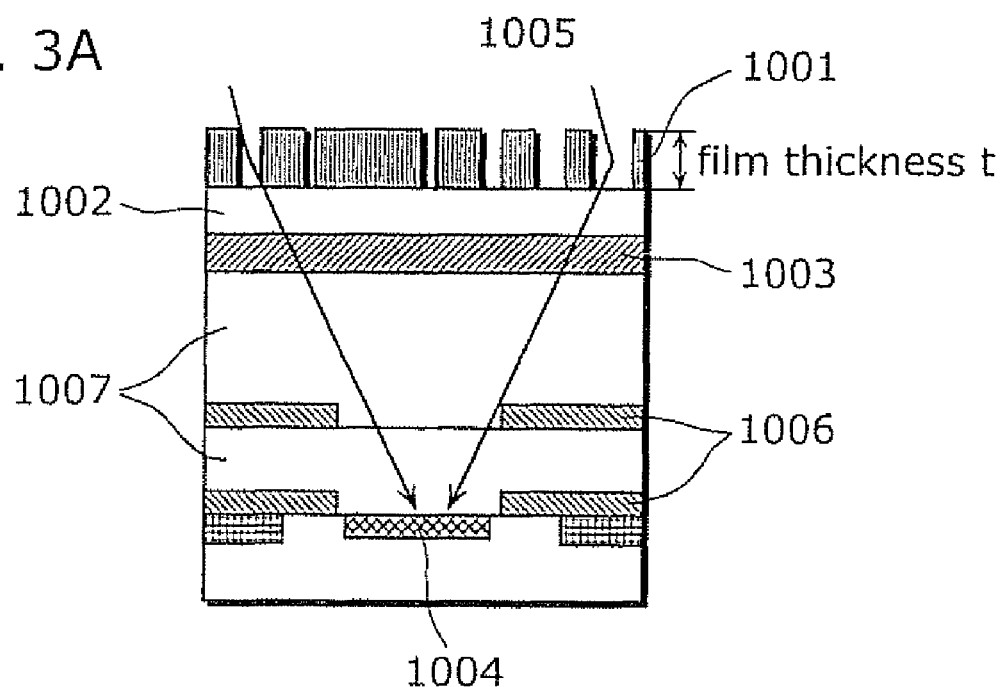
FIG. 3A is a cross-section diagram of a light-collecting device according to a first embodiment of the present invention.
Figure 3B:
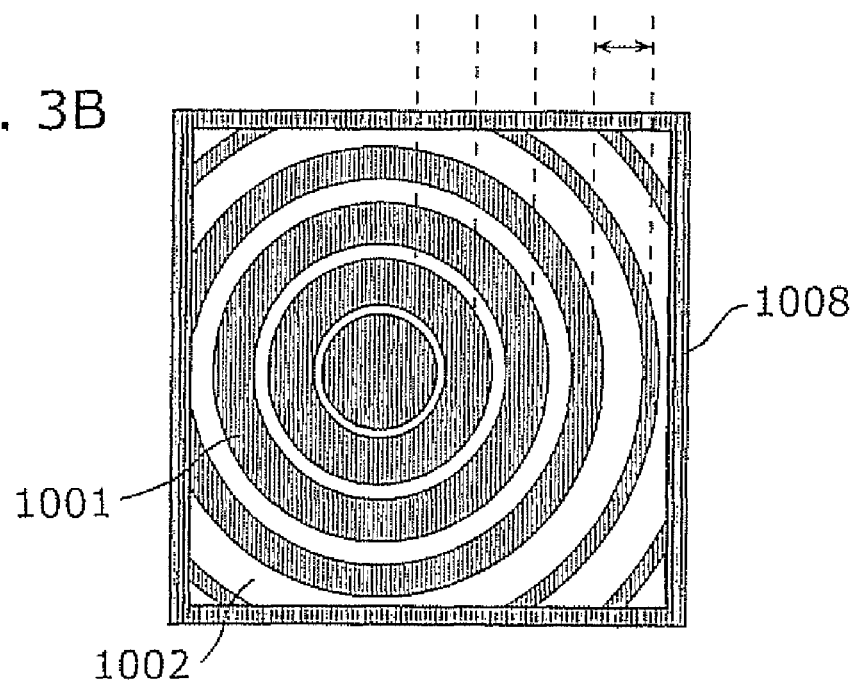
FIG. 3B is a top view according to the first embodiment of the present invention.

FIG. 3A is a diagram showing a cross-section of a pixel unit having a light-collecting device (a lens) according to the first embodiment. FIG. 3B shows a top view of the pixel unit. This pixel unit includes light-transmitting films 1001, a substrate 1002, a color filter 1003, a photodiode 1004, Aluminum wiring 1006, a planarized film 1007, and a frame 1008. The light-transmitting films 1001 have been processed into a substantially circle shape or a substantially concentric zone shape. A radial difference between adjacent zones (the perimeter of the light-transmitting film 1001 in FIG. 3B) is assumed to be a constant value. The width of a zone is as long as a wavelength of natural light. The width of a zone is typically as long as 0.1 μm. The refractive index of the incident light 1005 which passes through the respective light-transmitting films 1001 and a medium (typically, air) is a mean value between a value of the refractive index of the light-transmitting film 1001 and a value of the refractive index of the medium (typically, air), in a region as large as a wavelength on the surface of the light-transmitting film 1001. Since the width of a zone is very small, the refractive index of the incident light 1005 depends on the width of the zone, and becomes an intermediate value between the refractive index of the light-transmitting film 1001 and the refractive index of the medium. Specifically, the incident light 1005 enters the light transmitting films 1001 in which refractive indexes are concentrically distributed. Due to this refractive index distribution, the incident light 1005 which has passed through the respective light-transmitting films 1001, and the medium (typically, air) and the substrate 1002 is collected by a diffraction effect and reaches the photodiode 1004. A position where the incident light 1005 is collected can be controlled by changing a shape of the light-transmitting films 1001. Accordingly, incident light can be collected by the photodiode 1004 without causing performance deterioration by designing the shape of the light-transmitting films 1001 in consideration with an incident angle of the incident light 1005. The light-collecting efficiency thus can be increased even in the case where light enters at a large incident angle. The frame 1008 is made of the light-transmitting films so as to surround entire periphery of the pixel unit. The frame 1008 in FIG. 3B may surround only a part of the periphery instead of surrounding the entire periphery. Here, the width of the frame is 0.1 μm or less. It should be noted that the frame 1008 in FIG. 3B is made of a light-transmitting film. However, the frame 1008 may be formed with the absence of the light-transmitting film (i.e. air) instead. With the formation of this frame 1008, a fine-processing can be realized using the phase shift mask.

FIG. 4 is a diagram showing a structure of the phase shift mask used for manufacturing a light-collecting device shown in FIG. 3A. This phase shift mask includes light-blocking portions 101, phase shift portions 102, light-transmitting portions 103, and light-blocking frames 104 that are formed as shown in FIG. 4A. The light-blocking portions 101, the phase shift portions 102 and the light-transmitting portions 103 are shaped into concentric circles having a same center or zones.

In the phase shift mask, there is a restriction that a light-transmitting portion and a phase shift portion should not be adjacent to each other so that a light-blocking portion has to be placed between them. In the phase shift mask shown in FIG. 4A, the light-blocking frames 104 are placed so as to surround the pixel layout 108. The width of the light-blocking frame 104 may be a minimum manufacturing dimension of the phase shift mask, which is, for example, about 0.4 μm. Thus, by placing the light-transmitting portions 103 and the phase shift portions 102 in the pixel layout 108 so as not to be adjacent to each other, the light-blocking frame 104 prevents the light-transmitting portion 103 and the phase shift portion 102 from being adjacent to each other at the boundary with adjacent pixels. The above restriction is thus satisfied.

Hereinafter, the method of manufacturing a light-collecting device according to the first embodiment of the present invention shall be described in order of manufacturing processes. FIGS. 4B to 4E are diagrams showing processes of manufacturing an imaging device using a phase shift mask shown in FIG. 4A.

Figure 4A:
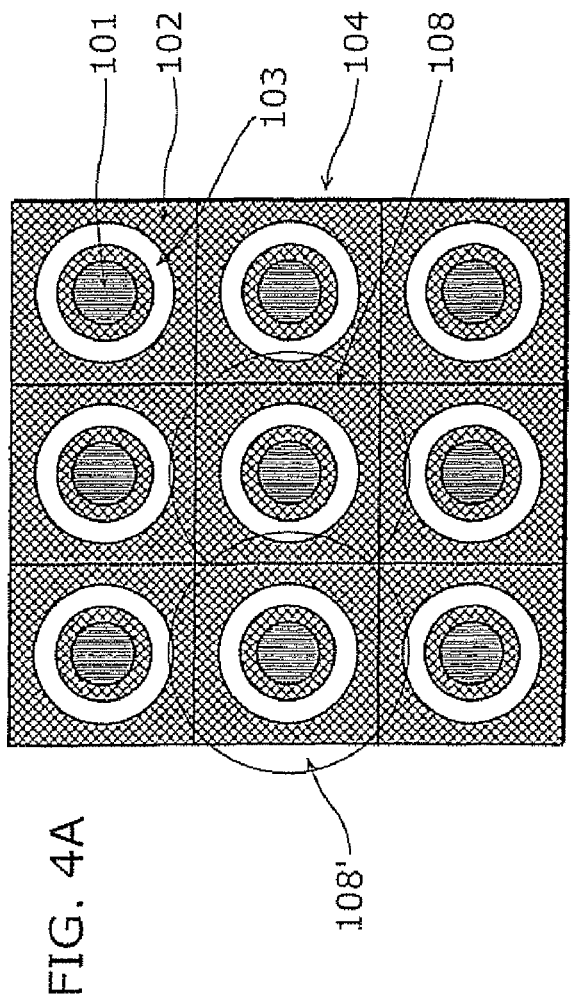
FIG. 4A is a diagram showing a structure of a phase shift mask used for manufacturing a light-collecting device.
Figure 4E:
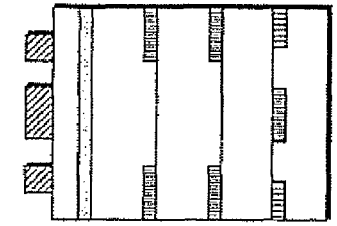
FIG. 4B to FIG. 4E are diagrams, each showing a process of manufacturing an imaging device.
Figure 4D:
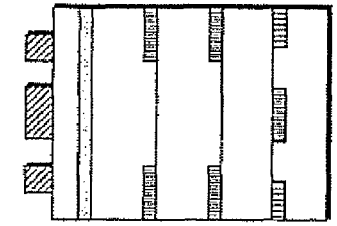
Figure 4C:
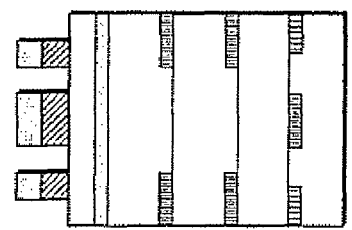
Figure 4B:
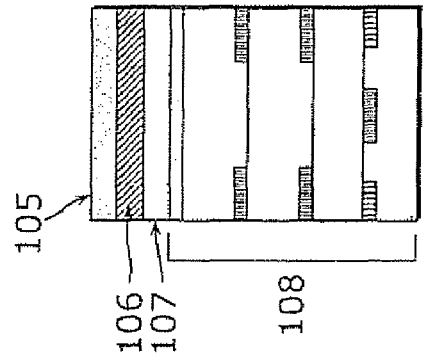

As shown in FIG. 4B, first, a substrate 107 and the light-transmitting film 106 are uniformly formed on the top surface of the pixel 108. A photoresist 105 is applied on top of the light-transmitting film 106. The photoresist 105 is then exposed to light using the phase shift mask shown in FIG. 4A and developed. FIG. 4C shows the result of the development. In the phase shift mask shown in FIG. 4A, the light-transmitting portion 103 is placed in an adjacent region on one side of the light-blocking portion 101, and the phase shift portion 102 is placed in an adjacent region on the other side of the light-blocking portion 101. Consequently, even in the case where the width of the light-blocking portion 101 is very small, light transmitted by the light-transmitting portion 103 and light transmitted by the phase shift portion 102 cancel each other out under the light-blocking portion 101, and the photoresist 105 is exposed to light with the shape of the light-blocking portion 101. Thus, a fine-processing can be easily realized.

After the photoresist 105 is exposed to light and developed as shown in FIG. 4C, the light-transmitting film 101 is etched using the photoresist 105 as an etching mask, and is processed into the shape of a phase shift mask as shown in FIG. 4A (FIG. 4D). Finally, the photoresist 105 is removed (FIG. 4E).

It should be noted that the structure of the imaging apparatus shown in FIGS. 4B to 4E is explained as an example, the structure may exclude the substrate 107 and include the light-transmitting film positioned directly on the pixel 108 (in this case, the pixel 108 is considered as a substrate). Furthermore, in the case where the top surface of the pixel 108 or the substrate 107 is flat, the pixel 108 and the substrate 107 may be structured differently from the structure shown in FIG. 4.

Second Embodiment

The following problem is found in the method of manufacturing the light-collecting device according to the aforementioned first embodiment. FIG. 6A is a diagram showing a shape of the photoresist 105, which is calculated by simulation, in the process shown in FIG. 4C according to the first embodiment of the present invention. In the diagram, white regions indicate where the photoresist 105 is to be remained and black regions indicate where the photoresist 105 is to be removed by development, seen from the top. In FIG. 6A, it is found that a portion corresponding to the peripheral light-blocking frames 104 of the pixel layout 108 cannot be formed precisely. In other words, whereas the light-blocking frames 104 are formed on the corners of the pixel layout 108, they are not formed in regions other than the corners. Therefore, it is assumed that the shape of the light-collecting device is distorted and the characteristics are deteriorated. Accordingly, in the second embodiment of the present invention, the following manufacturing method is adopted in order to precisely forming the light-blocking frames 104.

Figure 5:
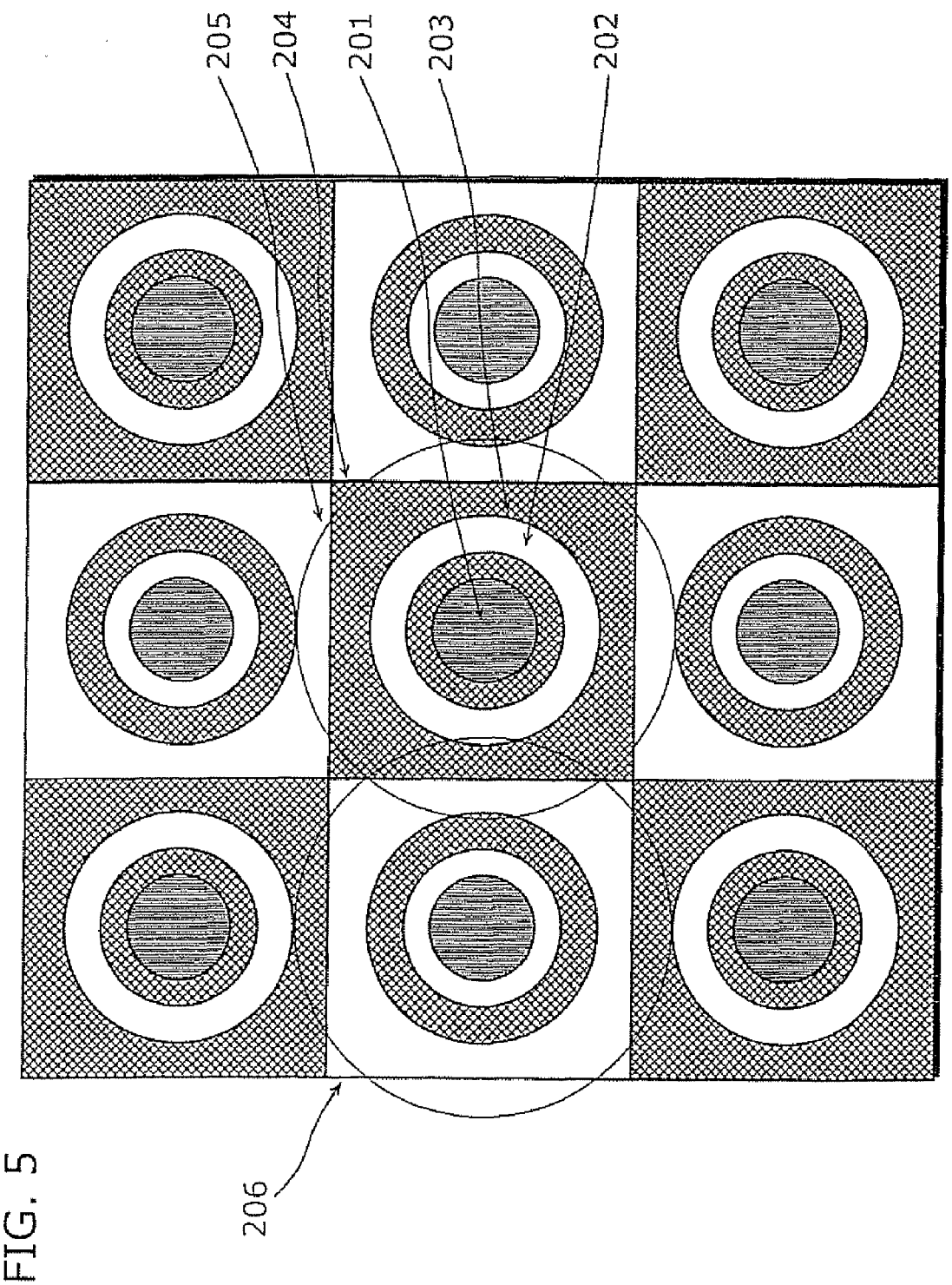
FIG. 5 is a phase shift mask according to a second embodiment of the present invention.

FIG. 5 shows a diagram showing a structure of the phase shift mask according to the second embodiment. This phase shift mask includes, for each pixel, a light-blocking portion 201, a light-transmitting portion 202, a phase shift portion 203, and a light-blocking frame 204. The phase shift mask includes two patterns of a fist pixel layout 205 and a second pixel layout 206. The first pixel layout 205 and the second pixel layout 206 are adjacent to each other. The phase shift mask shown in FIG. 5 is characterized in that the light-transmitting portions 202 and the phase shift portions 203 placed in the first pixel layout 205 are arranged in reverse in the second pixel layout 206.

The method of manufacturing a light-collecting device according to the second embodiment of the present invention is same as the manufacturing method according to the first embodiment of the present invention shown in FIGS. 4B to 4E, except using the phase shift mask shown in FIG. 5. In the phase shift mask shown in FIG. 5, the light-transmitting portion 202 is placed in a region on one side of the light-blocking frame 204 and the phase shift portion 203 is placed in a region on the other side of the light-blocking frame 204. Therefore, at the time of light exposition, light transmitted by the light-transmitting portion 202 and light transmitted by the phase shift portion 203 cancel each other out under the light-blocking frame 204, so that the light-blocking frames 204 are also precisely developed and formed.

Figure 6B:
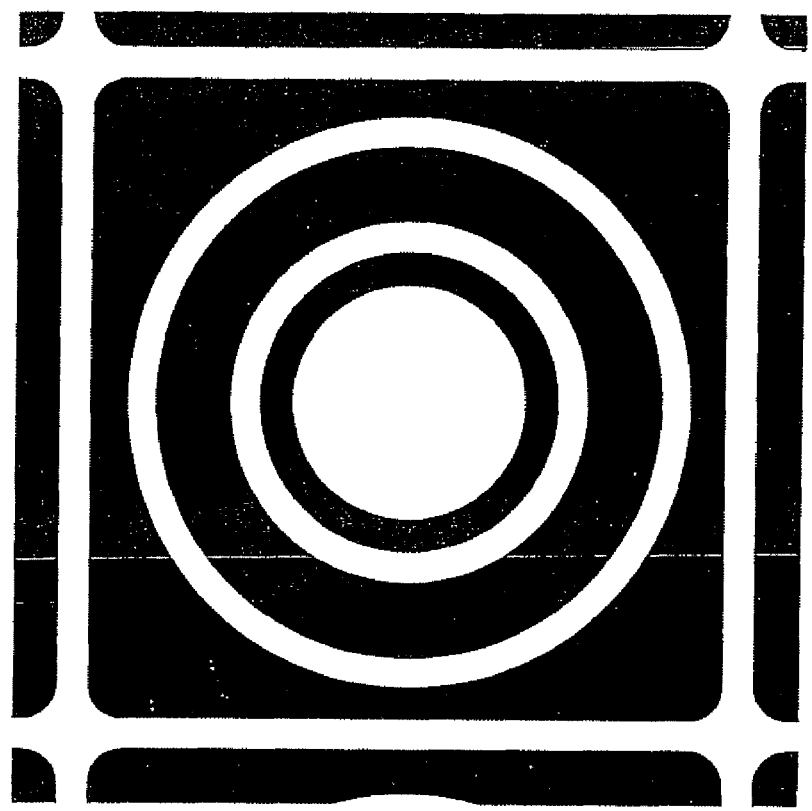
FIG. 6B is a diagram showing a shape of a photoresist in a manufacturing method according to the second embodiment.
Figure 6A:
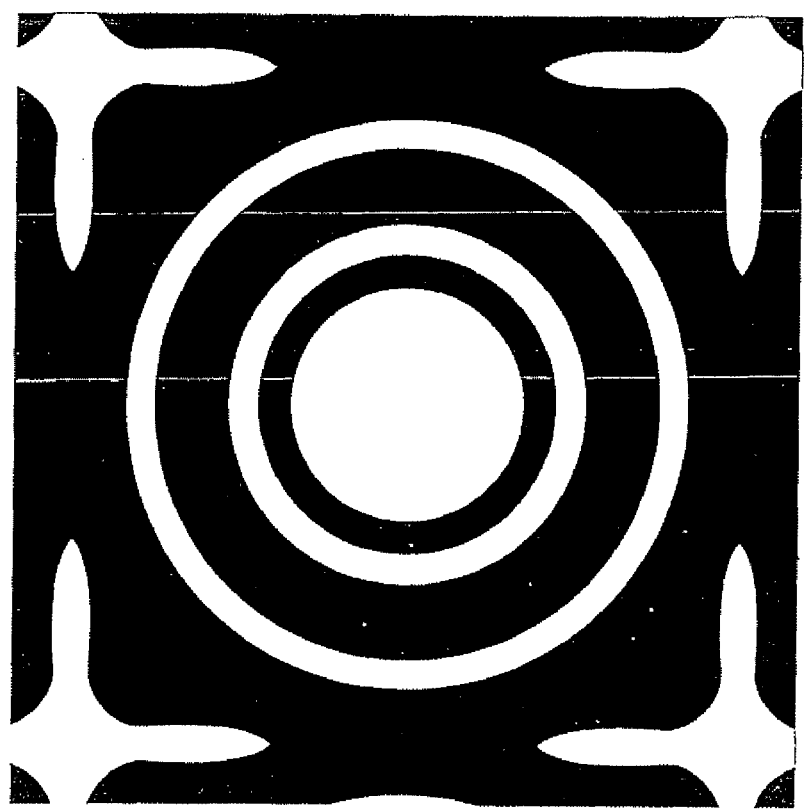
FIG. 6A is a diagram showing a shape of a photoresist in a manufacturing method according to the first embodiment.

FIG. 6B shows a simulation result of a shape of the photoresist in the case of the method of manufacturing the light-collecting device according to the second embodiment. Compared with the case of the first embodiment of the present invention shown in FIG. 6A, it can be seen that regions corresponding to light-blocking frames 204 are also precisely developed.

Third Embodiment

Figure 7A:
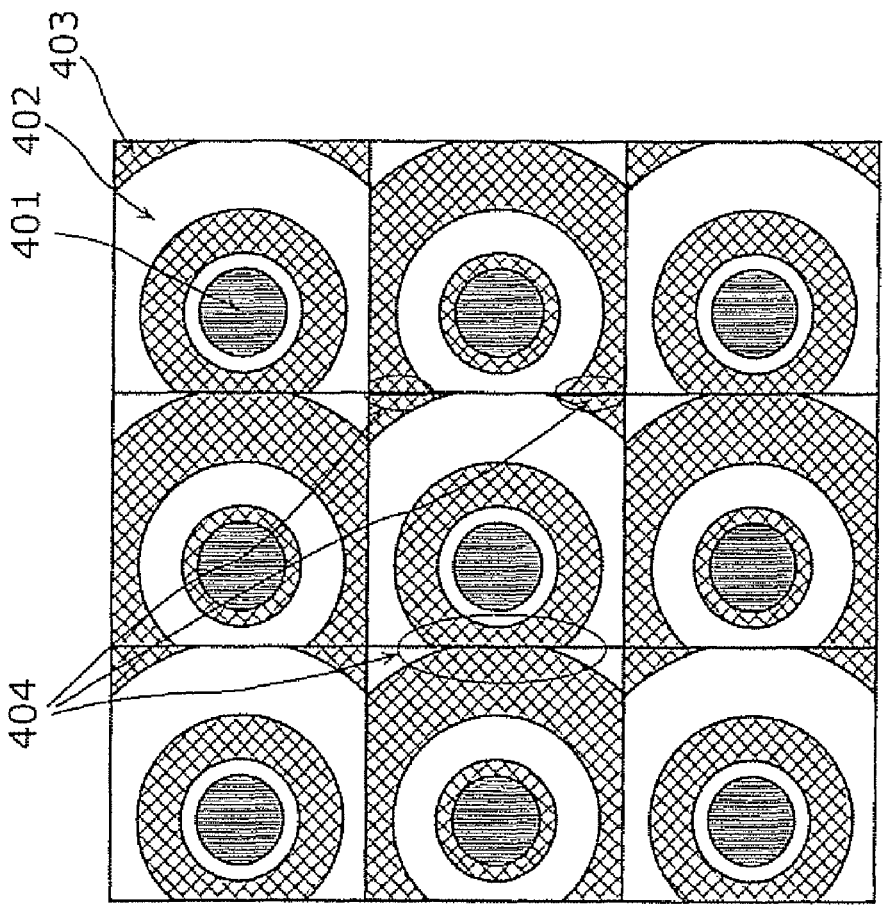
Figure 8B:
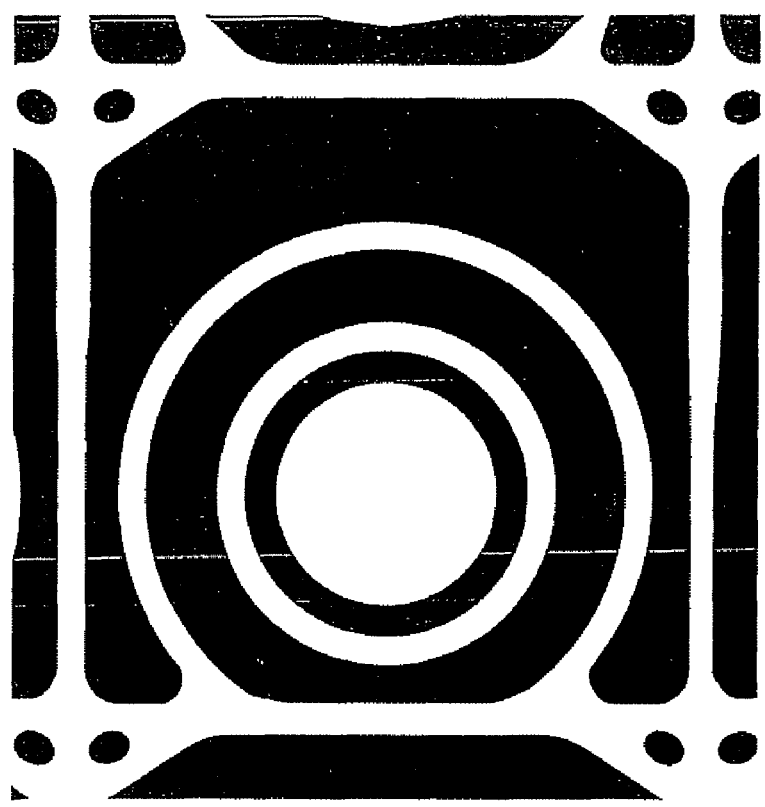
FIG. 8A and FIG. 8B are diagrams, each showing a shape of a photoresist in a manufacturing method of a light-collecting device according to the second and third embodiments.
Figure 8A:
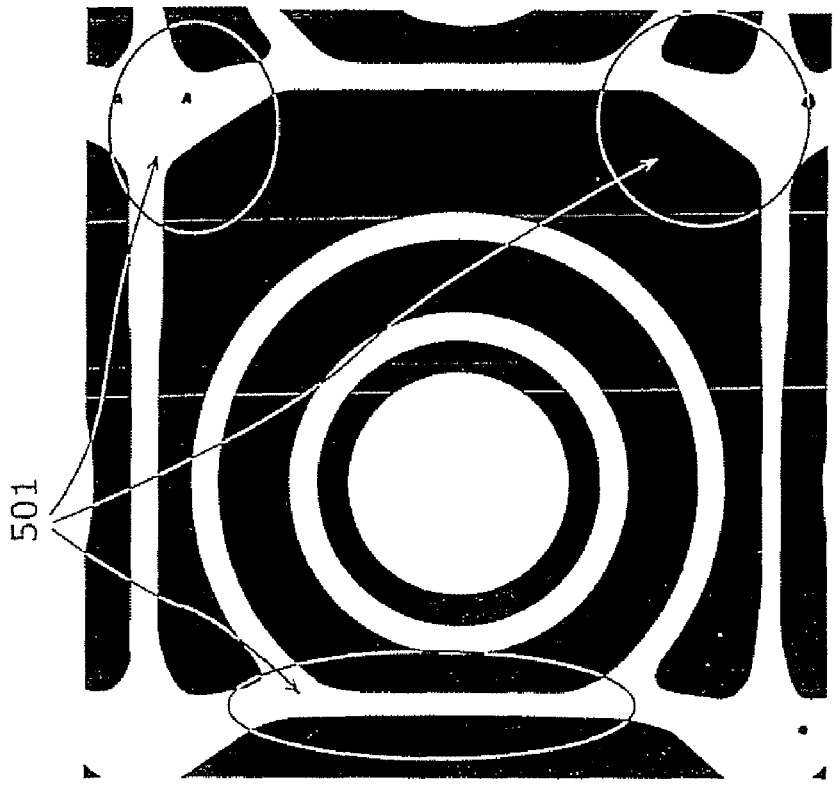

The following problem is found in the method of manufacturing the light-collecting device according to the aforementioned second embodiment. FIG. 7A is a diagram showing a structure of a phase shift mask used for a method of manufacturing a light-collecting device according to the third embodiment of the present invention. The difference between the phase shift mask in FIG. 7A and the phase shift mask in FIG. 5 is that FIG. 5 shows a shape of light-collecting devices placed near the center of the imaging plane in which pixels are arranged in a matrix while FIG. 7A shows a shape of light-collecting devices placed in the periphery of the imaging plane. In other words, each of the light-collecting devices shown in FIG. 7A is placed being shifted toward the center of the imaging plane. This phase shift mask includes light-blocking portions 401, light-transmitting portions 402, phase shift portions 403 and light-blocking frames 404. The phase shift portions 403 are placed on both sides of the light-blocking frames 404. FIG. 8A shows a simulation result of a shape of the photoresist after being exposed to light using the phase shift mask shown in FIG. 7A. In FIG. 8A, 501 shows regions corresponding to portions of the light-blocking frames 404. Here, it can be seen that there is a problem that the light-blocking frames 404 are distorted from the original shape designed by the phase shift mask. In other words, the second embodiment also has a problem to be solved that is the remaining distortion of the shape.

Figure 7B:
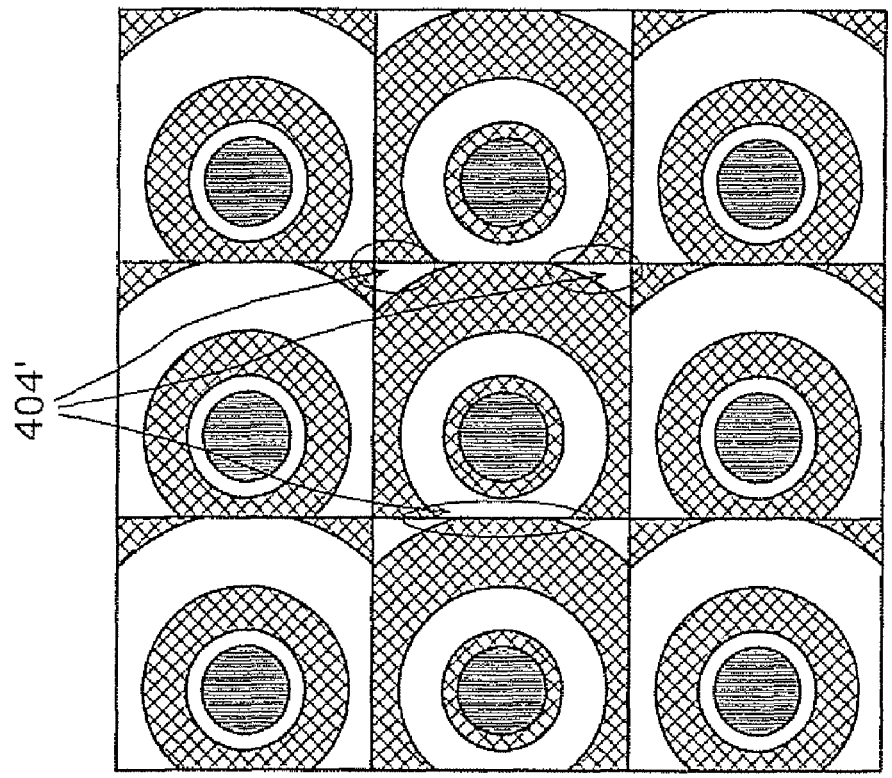
FIG. 7A and FIG. 7B are diagrams, each showing a structure of a phase shift mask according to a third embodiment of the present invention.

FIG. 7B shows a structure of another phase shift mask used for the method of manufacturing the light-collecting device according to the third embodiment. In FIG. 7A, phase shift portions 403 are placed on both sides of portions of the light-blocking frames 404. Therefore, light is leaked under the light-blocking frames at the time of light exposition, which causes a problem of distorting the shape of the photoresist 501. This is because the arrangement of the light-transmitting portions and the phase shift portions are simply reversed among adjacent pixel layouts placed on the right, left, top and bottom. In FIG. 7B, the arrangements of the phase shift portions 403 and the light-transmitting portions 402 in pixel layouts are determined so that portions (i.c. 404) where the phase shift portions 403 are placed on both sides of the light-blocking frames are minimized. The arrangements of the phase shift portions 403 and light-transmitting portions 402 in pixel layouts are also similarly determined so that portions where the light-transmitting portions 402 are placed on both sides of the light-blocking frames are minimized. A portion 404' of the light-blocking frame in FIG. 7B has the light-transmitting portion 402 on one side and the phase shift portion 403 on the other side. Therefore, as shown in FIG. 5B, the distortions are lessened in the shape of the photoresist generated by the phase shift mask of FIG. 7B so that the aforementioned problem is overcome. Other manufacturing processes are same as those in the first and second embodiments according to the present invention.

Fourth Embodiment

Figure 9A:
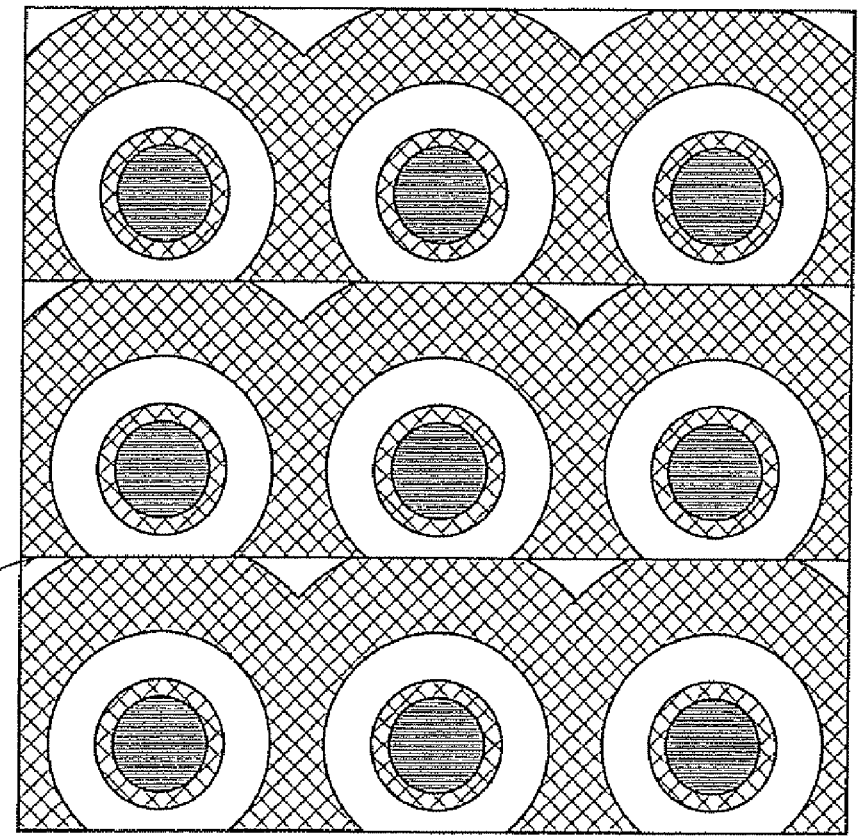
FIG. 9A and FIG. 9B are diagrams, each showing a structure of a phase shift mask according to a fourth embodiment.
Figure 9B:
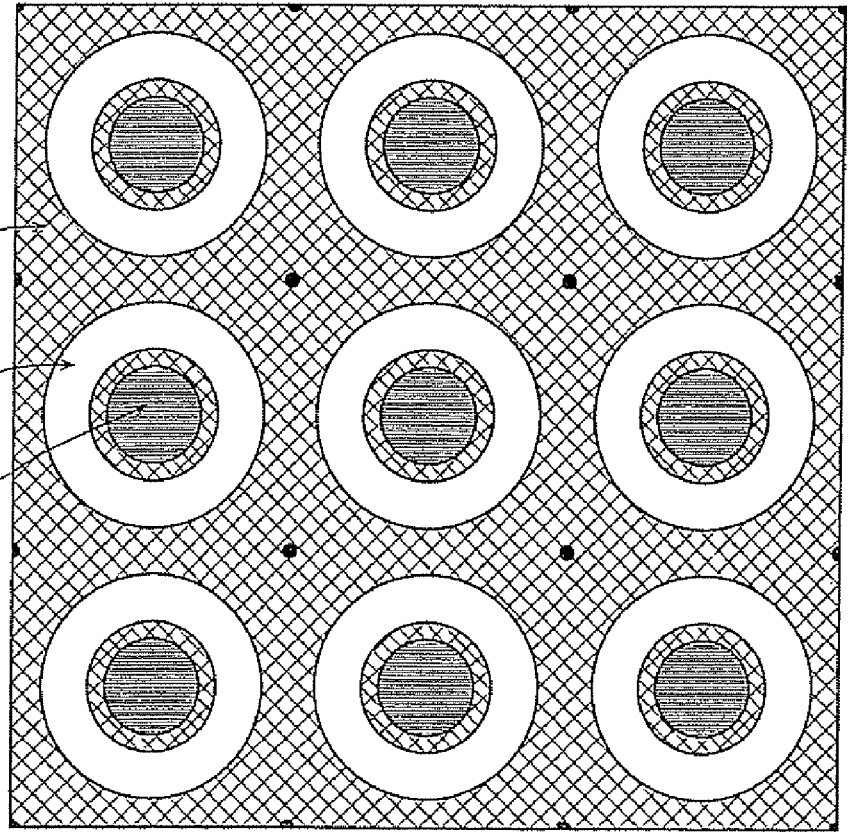

In the aforementioned first to third embodiments, a phase shift mask in which light-blocking frames are arranged all around the pixel layouts is used. However, the light-blocking frames are not always necessary in the case where the light-transmitting portions are adjacent to each other at the pixel boundaries, or in the case where the phase shift portions are adjacent to each other at the pixel boundaries. The light-blocking frames are only necessary for the region in which the light-transmitting portions and the phase shift portions are adjacent to each other at the pixel boundaries. The phase shift masks shown in FIGS. 9A and 9B are used for the method of manufacturing the light-collecting device according to the fourth embodiment of the present invention, and the light-blocking frames are placed only on the regions in which the light-transmitting portions and the phase shift portions are adjacent to each other at the pixel boundaries. Other manufacturing processes are same as those in the first and third embodiments.

FIG. 9A shows a phase shift mask used for manufacturing pixels positioned in the center of the imaging device. This phase shift mask includes light-blocking portions 601, light-transmitting portions 602, and phase shift portions 603. Since perimeters of pixel layouts are all made of phase shift portions, the light-blocking frames are not present in FIG. 9A.

FIG. 9B shows a phase shift mask used for manufacturing pixels positioned in the periphery of the imaging device. The light-blocking frames 604 are placed only in the regions in which the phase shift portions 603 and the light-transmitting portions 602 are adjacent to each other at the pixel boundaries.

Fifth Embodiment

In the aforementioned fourth embodiment, as shown in FIGS. 9A and 9B, the light-blocking frames are placed only in the regions in which the light-transmitting portions and the phase shift portions are adjacent to each other at the pixel layout boundaries. The light-blocking frames are unnecessary for the structure of a light-collecting device itself. The decrease in an area of the light-blocking frame results in an increase in the area of the light-collecting device. Therefore, the characteristics of the light-collecting device are improved. Furthermore, the unevenness of the optical characteristics due to the light-blocking frames can be reduced.

Figure 10:
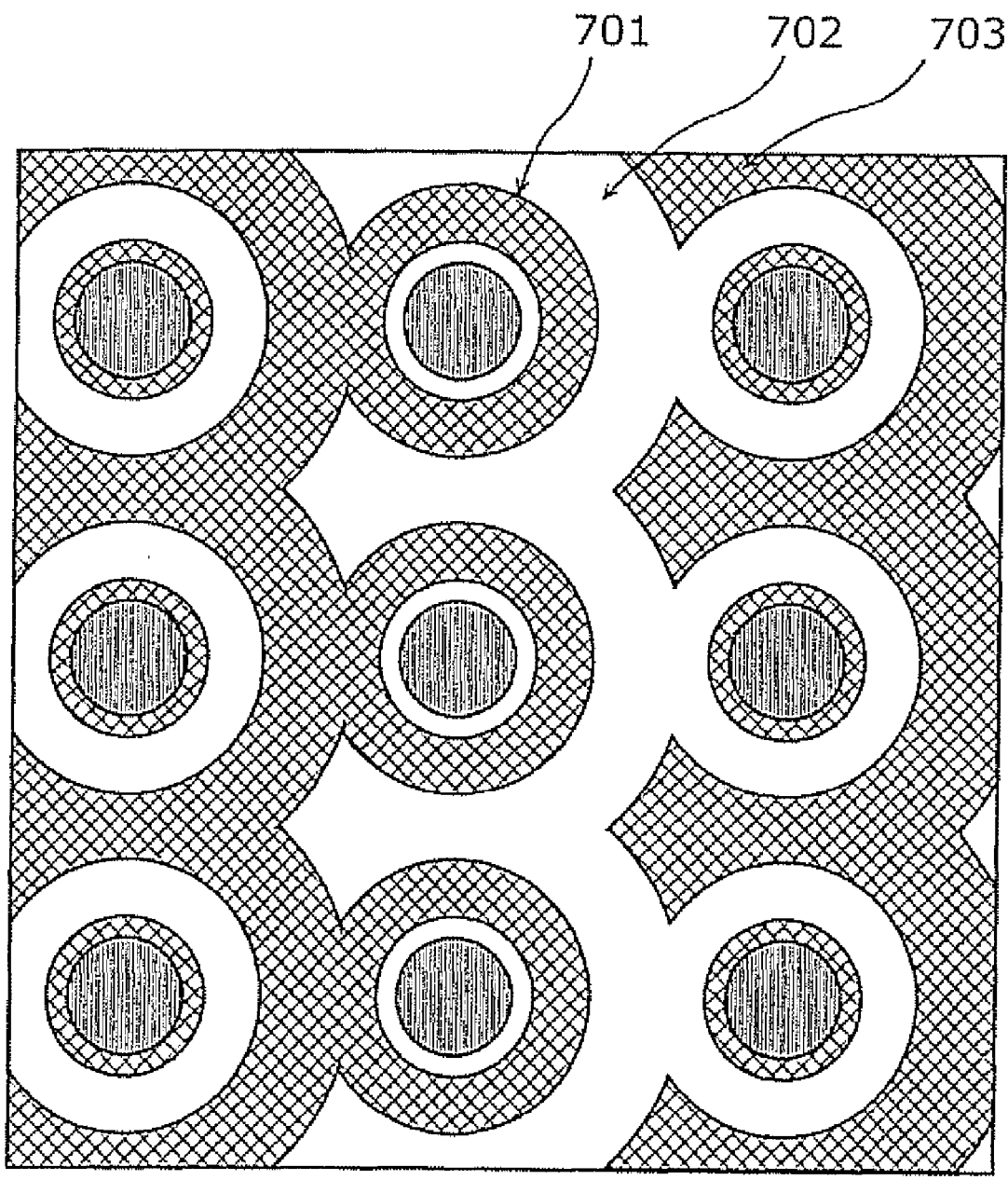
FIG. 10 is a diagram showing a structure of a phase shift mask according to a fifth embodiment.
Figure 11:
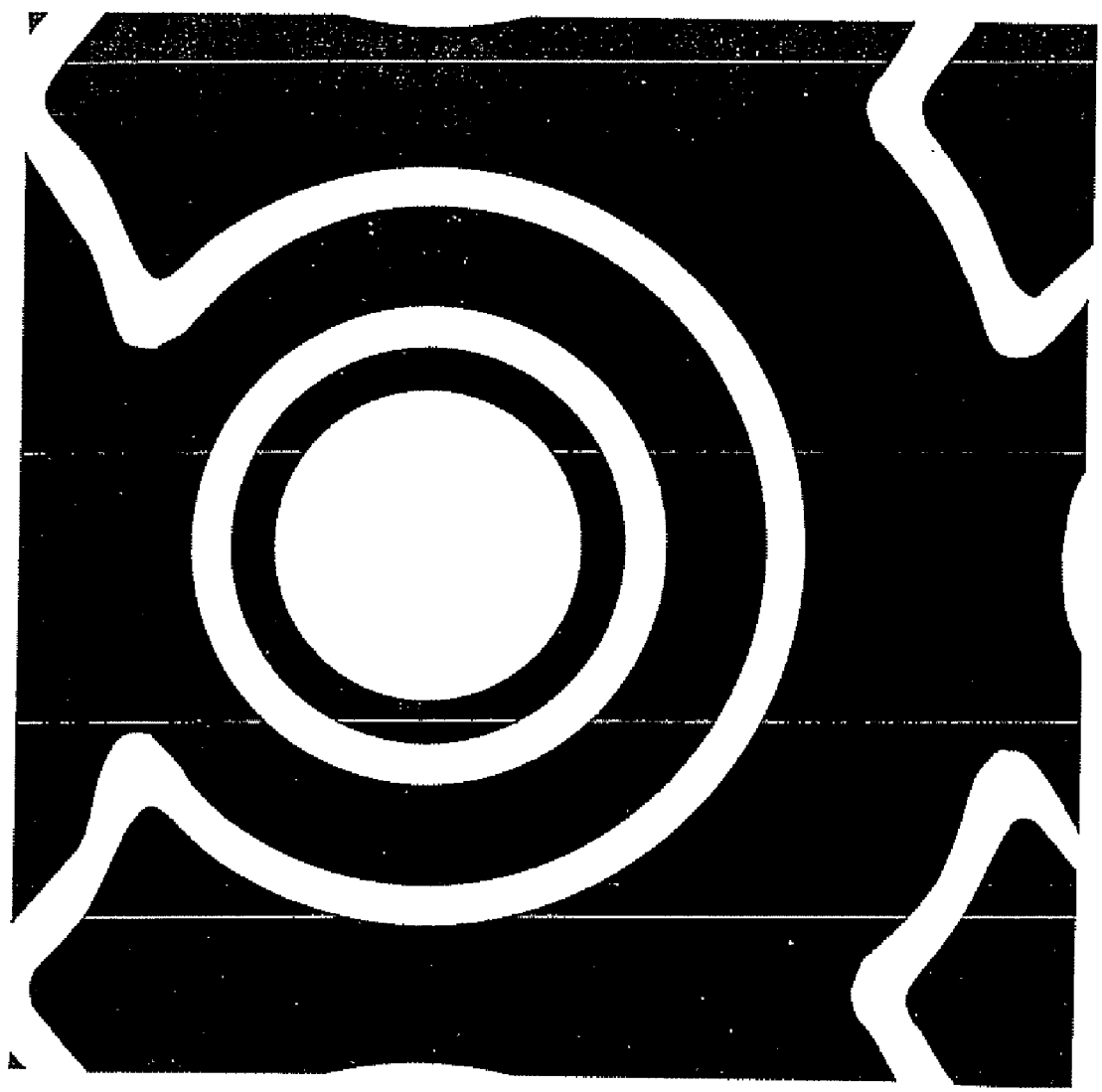
FIG. 11 is a diagram showing a shape of a photoresist in a manufacturing method of a light-collecting device according to the fifth embodiment.

FIG. 10 is a diagram showing a structure of a phase shift mask which is used for the purpose of improving characteristics of the light-collecting device by minimizing the area of the light-blocking frames. This phase shift mask includes light-blocking portions 701, light-transmitting portions 702, and phase shift portions 703. Firstly, in each pixel, the light-transmitting portions 702 and the phase shift portions 703 are arranged so that the light-transmitting portions 702 and the phase shift portions 703 are adjacent to each other at each pixel layout boundary with a minimum area. Next, the light-blocking frames are placed only in the regions in which the light-transmitting portions 702 and the phase shift portions 703 are adjacent to each other at each pixel layout boundary. Following this procedure, an area of the light-blocking frames can be minimized and the characteristics of the light-collecting device can be maximized. The phase shift mask shown in FIG. 10 has a structure which does not require the light-blocking frames. FIG. 11 is a diagram which shows a shape of the photoresist obtained by simulation. In the light-collecting device, frames are buried in the light-transmitting film (or a region in which the light-transmitting film does not exist).

Other manufacturing processes are same as those described in the first and fourth embodiments according to the present invention. Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A method of manufacturing a lens, said method comprising
   exposing a photoresist to light using a phase shift mask,
   wherein the phase shift mask includes
   layout portions respectively corresponding to pixels and lenses,
   wherein each of the layout portions has:
      a light-blocking portion which has a substantially circular shape or a substantially concentric zone shape;
      a light-transmitting portion which has a substantially circular shape or a substantially concentric zone shape;
      a phase shift portion which has a substantially circular shape or a substantially concentric zone shape; and
      a light-blocking frame,
   wherein light which passes through the phase shift portion is phase-shifted 180 degrees with respect to light which passes through the light-transmitting portion,
   wherein the light-transmitting portion, the light-blocking portion and the phase shift portion are arranged alternately so as to form concentric circles, and
   wherein the light-blocking frame corresponds to a whole or a part of a perimeter of the lens.

2. The method of manufacturing a lens according to claim 1,
   wherein a width of the light-blocking frame is as large as a minimum manufacturing dimension of the phase shift mask.

3. The method of manufacturing a lens according to claim 1,
   wherein a width of the light-blocking frame is approximately 0.4 μm.

4. The method of manufacturing a lens according to claim 1,
   wherein the layout portions include a first layout portion corresponding to a first pixel, and four adjacent layout portions corresponding to four pixels which are respectively adjacent in all four directions to the first pixel,
   phase shift portions are positioned in regions of the adjacent layout portions, the regions corresponding to a region of the first layout portion in which a light-transmitting portion is positioned, and
   light-transmitting portions are positioned in regions of the adjacent layout portions, the regions corresponding to a region of the first layout portion in which a phase shift portion is positioned.

5. The method of manufacturing a lens according to claim 1, wherein the layout portions include a first layout portion corresponding to a first pixel, and a second layout portion corresponding to a pixel adjacent to the first pixel, a first section and a second section are included in a light-blocking frame at which the first layout portion and the second layout portion are adjacent to each other, the first section is smaller than the second section, the first section is a section having phase shift portions on both sides of the light-blocking frame, and is a section having light-transmitting portions on both sides of the light-blocking frame, and the second section is a section having a phase shift portion on one side of the light-blocking frame and a light-transmitting portion on the other side of the light-blocking frame.

6. The method of manufacturing a lens according to claim 1, wherein the layout portions include a first layout portion corresponding to a first pixel and a second layout portion corresponding to a second pixel adjacent to the first pixel, a light-blocking frame is positioned in a specific section in a boundary between the first layout portion and the second layout portion, and the specific section is a section having a phase shift portion on one side of the boundary and a light-transmitting portion on the other side of the boundary.

7. The method of manufacturing a lens according to claim 6, wherein the specific section is smaller than other sections in the boundary of a perimeter of each layout portion.

8. A phase shift mask used for manufacturing a lens, said phase shift mask comprising layout portions respectively corresponding to pixels and lenses, wherein each of the layout portions has:

a light-blocking portion which has a substantially circular shape or a substantially concentric zone shape;

a light-transmitting portion which has a substantially circular shape or a substantially concentric zone shape;

a phase shift portion which has a substantially circular shape or a substantially concentric zone shape; and a light-blocking frame, wherein light which passes through the phase shift portion is phase-shifted 180 degrees with respect to light which passes through the light-transmitting portion, wherein the light-transmitting portion, the light-blocking portion and the phase shift portion are arranged alternately so as to form concentric circles, and wherein the light-blocking frame corresponds to a whole or a part of a perimeter of the lens.

9. The phase shift mask according to claim 8, wherein a width of the light-blocking frame is as large as a minimum manufacturing dimension of the phase shift mask.

10. The phase shift mask according to claim 8, wherein a width of the light-blocking frame is approximately 0.4 μm.

* * * * *